(12) United States Patent
Mammarella et al.

(10) Patent No.: US 10,280,340 B2
(45) Date of Patent: May 7, 2019

(54) USE OF HOLLOW POLYMERIC MICROSPHERES IN COMPOSITE MATERIALS REQUIRING FLAME RESISTANCE

(71) Applicant: Henkel IP & Holding GmbH, Duesseldorf (DE)

(72) Inventors: Robert E. Mammarella, Greer, SC (US); David Sturgill, Brookfield, WI (US)

(73) Assignee: Henkel IP & Holding GmbH, Duesseldorf (DE)

( * ) Notice: Subject to any disclaimer, the term of this patent is extended or adjusted under 35 U.S.C. 154(b) by 194 days.

(21) Appl. No.: 15/450,173

(22) Filed: Mar. 6, 2017

(65) Prior Publication Data
US 2017/0174955 A1 Jun. 22, 2017

Related U.S. Application Data

(63) Continuation of application No. PCT/US2015/049077, filed on Sep. 9, 2015.

(60) Provisional application No. 62/050,979, filed on Sep. 16, 2014.

(51) Int. Cl.
| | | |
|---|---|---|
| *C08J 9/00* | (2006.01) | |
| *C08J 9/14* | (2006.01) | |
| *C08J 9/18* | (2006.01) | |
| *C08K 7/22* | (2006.01) | |
| *C09D 5/00* | (2006.01) | |
| *C08J 9/224* | (2006.01) | |
| *C08L 27/06* | (2006.01) | |
| *C08L 33/20* | (2006.01) | |
| *C09J 11/04* | (2006.01) | |
| *C09J 11/08* | (2006.01) | |
| *C09K 21/14* | (2006.01) | |
| *C09D 127/06* | (2006.01) | |
| *C09J 127/06* | (2006.01) | |
| *C09J 201/00* | (2006.01) | |

(52) U.S. Cl.
CPC ............ *C09J 11/08* (2013.01); *C08J 9/0066* (2013.01); *C08J 9/141* (2013.01); *C08J 9/18* (2013.01); *C08J 9/224* (2013.01); *C08L 27/06* (2013.01); *C08L 33/20* (2013.01); *C09D 5/00* (2013.01); *C09D 127/06* (2013.01); *C09J 11/04* (2013.01); *C09J 127/06* (2013.01); *C09J 201/00* (2013.01); *C09K 21/14* (2013.01); *C08J 2203/14* (2013.01); *C08J 2203/22* (2013.01); *C08J 2207/02* (2013.01); *C08J 2333/20* (2013.01)

(58) Field of Classification Search
CPC . C09J 11/08; C09J 11/04; C09J 201/00; C08J 9/0066; C08J 9/224; C08J 2203/22; C09D 5/00
See application file for complete search history.

(56) References Cited

U.S. PATENT DOCUMENTS

| | | |
|---|---|---|
| 3,615,972 A | 10/1971 | Morehouse, Sr. et al. |
| 3,864,181 A | 2/1975 | Wolinski et al. |
| 4,006,273 A | 2/1977 | Wolinski et al. |
| 4,044,176 A | 8/1977 | Wolinski et al. |
| 4,722,943 A | 2/1988 | Melber et al. |
| 4,829,094 A | 5/1989 | Melber et al. |
| 4,843,104 A | 6/1989 | Melber et al. |
| 4,888,241 A | 12/1989 | Melber et al. |
| 4,898,892 A | 2/1990 | Melber et al. |
| 4,898,894 A | 2/1990 | Melber et al. |
| 4,908,391 A | 3/1990 | Melber et al. |
| 4,912,139 A | 3/1990 | Melber et al. |
| 5,011,862 A | 4/1991 | Melber et al. |
| 5,155,138 A | 10/1992 | Lundqvist |
| 5,180,752 A | 1/1993 | Melber et al. |
| 5,342,689 A | 8/1994 | Melber et al. |
| 5,484,815 A | 1/1996 | Petersen et al. |
| 5,536,756 A | 7/1996 | Kida et al. |
| 5,580,656 A | 12/1996 | Melber |
| 5,834,526 A | 11/1998 | Wu et al. |
| 6,225,361 B1 | 5/2001 | Nakajima |
| 6,235,394 B1 | 5/2001 | Shimazawa et al. |

(Continued)

FOREIGN PATENT DOCUMENTS

| | | |
|---|---|---|
| RU | 2301241 | 6/2007 |
| WO | 2007/046273 | 4/2007 |

(Continued)

OTHER PUBLICATIONS

International Search Report issued in connection with International Patent Application No. PCT/US2015/049077 dated Dec. 17, 2015.

*Primary Examiner* — Hai Vo
(74) *Attorney, Agent, or Firm* — Steven C. Bauman

(57) ABSTRACT

Disclosed is method of preparing microspheres wherein the microspheres do not increase the self-extinguishing time of a composition they are added to by more than 5% and their presence does not increase a viscosity of the composition by more than 65%. The microspheres are coated with a very high level of from 80 to 90% by weight of a flame retardant, preferably aluminum trihydroxide. Unexpectedly, the presence of the flame retardant on the microspheres at this high level reduces the need to add additional flame retardant to a composition along with the microspheres. Also unexpectedly, the location of the flame retardant on the microspheres completely prevents the normally expected increase in viscosity of the composition based on the level of the flame retardant added. The microspheres find use in many compositions requiring flame resistance including weld through sealants and adhesives.

18 Claims, No Drawings

(56) References Cited

U.S. PATENT DOCUMENTS

| | | |
|---|---|---|
| 6,235,800 B1 | 5/2001 | Kyuno et al. |
| 6,365,641 B1 | 4/2002 | Masuda et al. |
| 6,509,384 B2 | 1/2003 | Kron et al. |
| 6,903,143 B2 | 6/2005 | Masuda et al. |
| 7,192,989 B2 | 3/2007 | Svedberg et al. |
| 7,351,752 B2 | 4/2008 | Miki et al. |
| 7,368,167 B2 | 5/2008 | Johnston et al. |
| 8,324,286 B2 | 12/2012 | Masuda et al. |
| 8,329,298 B2 | 12/2012 | Masuda et al. |
| 2004/0176487 A1 | 9/2004 | Svedberg et al. |
| 2005/0080151 A1 | 4/2005 | Miki et al. |
| 2005/0282014 A1 | 12/2005 | Johnston et al. |
| 2007/0208093 A1 | 9/2007 | Nordin et al. |
| 2007/0287776 A1 | 12/2007 | Nordin et al. |
| 2008/0017338 A1 | 1/2008 | Nordin et al. |
| 2008/0167412 A1 | 7/2008 | Sohaib et al. |
| 2011/0178197 A1 | 7/2011 | Richard et al. |

FOREIGN PATENT DOCUMENTS

| | | |
|---|---|---|
| WO | 2007/058379 | 5/2007 |
| WO | 2010/039624 | 4/2010 |

USE OF HOLLOW POLYMERIC MICROSPHERES IN COMPOSITE MATERIALS REQUIRING FLAME RESISTANCE

RELATED APPLICATIONS

None.

STATEMENT REGARDING FEDERALLY SPONSORED RESEARCH

None.

TECHNICAL FIELD

This invention relates generally to hollow polymeric microspheres and more specifically to a method of coating the microspheres with a flame retardant in a way that results in reduced flammability when they are incorporated into a composition and no additional increase in viscosity of the composition due to the presence of the flame retardant.

BACKGROUND OF THE INVENTION

Expanded hollow polymeric microspheres based on thermoplastic polymers are known in the art and are used as low density fillers in various types of compositions such as coatings, adhesives including weld through adhesives, sealants including weld through sealants, and composites. Typically, the microspheres are prepared by emulsion polymerization of one or more monomers in the presence of one or more volatile substances such as a light, low boiling, hydrocarbon or halogenated organic compound. The monomers polymerize to form a shell that encapsulates the volatile substances which serve as blowing agents when the microspheres are expanded. The resulting microspheres are then heated to effect expansion of the shells as a result of the internal pressure created by the volatile substances together with a softening of the thermoplastic resulting from polymerization of the monomers. To help minimize agglomeration of the expanded microspheres and to provide such microspheres in a free-flowing form, it is known to coat the outer surfaces of the microspheres with processing aids such as calcium carbonate, silicate, or talc. See, for example, U.S. Pat. Nos. 4,722,943 and 5,180,752. In many applications, it is desirable for such microspheres to have as low a density as possible in order to reduce the weight and/or cost of the article prepared using the microspheres. However, it has been found that low density calcium carbonate-coated expanded microspheres can be flammable solids and thus may represent an explosion hazard. For example, microspheres having a composite density of 0.030 $g/cm^3$ and containing 65 weight percent calcium carbonate as a coating based on the total weight of microspheres and calcium carbonate are flammable. When one increases the calcium carbonate coating to a level of 85 weight percent this reduces the flammability; however when added to a composition these same microspheres can significantly increase the flammability of the composition they are added to. Another process for dealing with the flammability issue is to include additional levels of flame retardants in the compositions that the microspheres are being added to. This is a less than satisfactory option for a number of reasons. The addition of the microspheres requires a large amount of flame retardant to be added to the composition and this increases the cost of the composition. In addition, the added flame retardant often increases the viscosity of the composition, which can be a substantial problem in processing of the composition and its subsequent final use. Since use of the microspheres themselves often adds to the viscosity of the composition, this additional viscosity from the flame retardant can be problematic.

It would therefore be advantageous to develop methods for preparing microspheres that don't add to the flammability of a composition they are added to. In addition, preferably the presence of the microspheres does not require additional flame retardant be added to the composition and thus not leading to changes to the viscosity of the composition caused by the flame retardant beyond the increase caused by use of the microspheres themselves.

SUMMARY OF THE INVENTION

In general terms, this invention provides microspheres that have a reduced effect on the flammability of compositions that they are incorporated into. The inventive process for preparing the microspheres results in more effective use of flame retardants to reduce the flammability of the microspheres when they are added to compositions. The microspheres prepared by the inventive process also have a reduced effect on viscosity when added to compositions compared to standard microspheres plus flame retardants.

In one embodiment the present invention is a composition comprising: a base component; a plurality of hollow, expanded microspheres having a composite density of 0.1 $g/cm^3$ or greater and comprising from 80 to 90% by weight of aluminum trihydroxide, wherein the microspheres are present in an amount of from 1 to 25% by weight based on the total weight of the composition and wherein the presence of the microspheres does not increase a self-extinguishing time of the base component by more than 5%.

In another embodiment the present invention is a method of maintaining the nonflammability of a base component while reducing its density comprising the steps of: providing a base component; providing a plurality of hollow, expanded microspheres having a composite density of 0.1 $g/cm^3$ or greater and comprising from 80 to 90% by weight of aluminum trihydroxide; combining the microspheres in an amount of from 1 to 25% by weight based on the total weight of the composition with the base composition, wherein addition of the microspheres does not increase a self-extinguishing time of the base component by more than 5%.

In another embodiment the present invention is a laminate comprising: a metal substrate; and a composition applied to the metal substrate; the composition comprising a weld through sealant and a plurality of microspheres, the microspheres present in an amount of from 1 to 25% by weight based on a total weight of the composition and wherein the microspheres comprise 80 to 90% by weight of aluminum trihydroxide and have a composite density of 0.1 $g/cm^3$ or greater, and wherein the presence of the microspheres does not increase a self-extinguishing time of the weld through sealant by more than 5%.

These and other features and advantages of this invention will become more apparent to those skilled in the art from the detailed description of a preferred embodiment.

DETAILED DESCRIPTION OF A PREFERRED EMBODIMENT

Microspheres find many uses in the preparation of various compositions including coatings, foams, adhesives, weld through adhesives, sealants, weld through sealants, and composite materials. The addition of microspheres is used to reduce the weight of compositions. Microspheres can be used to reduce cost of materials on a volume basis. The microspheres can increase the thermal insulation value of a composition. In addition, the microspheres can increase the mechanical resiliency and reduce the dry time of compositions. Unexpanded microspheres are often combined with processing aids like calcium carbonate, silica, or talc to maintain them in a non-agglomerated state during heated expansion, with the result that the processing aids adhere to the expanded microspheres.

One issue with use of microspheres in compositions is that the addition of microspheres to a composition often increases the flammability of the composition. This is largely a result of the blowing agents used in the microspheres. One common test protocol used to evaluate the flammability of components, such as microspheres, is the United Nations/Department of Transportation Burning Rate test for Readily Combustible Solids, Division 4.1, Test N.1 described in Section 33 of "Classification Procedures, Test Methods and Criteria Relating to Class 4" of the Fourth Revised Edition of the Recommendations of the Transport of Dangerous Goods Manual of Tests and Criteria. A substance is considered "nonflammable" if the substance exhibits a burn time over 100 millimeters (mm) of greater than 45 seconds under the testing protocol. A summary of this test procedure is as follows: a sample in powder form of a test substance is filled into a mold 250 mm long with a triangular cross section having a height of 10 mm and a width of 20 mm. After tapping the mold to settle the sample, it is inverted onto an impervious non-combustible plate of low thermal conductivity. The mold is removed and the ignition source, flame or hot wire above 1000° C., is placed at one end of the sample train for 2 minutes or until the sample ignites. When the sample has burned a distance of 80 mm, the rate of burning over the next 100 mm is measured. The test is repeated 6 times using a cool clean plate each time. In the present specification and claims a substance is "non-flammable" if the substance exhibits a burn time over the 100 mm of greater than 45 seconds under this testing protocol.

Many standardized protocols and procedures rely on the above test for "nonflammable" as a criterion for how the material should be classified for transportation and shipment. One of the problems with the test is that materials can pass this test even if they support a flame provided they burn slowly enough. For example, some microspheres can pass this test and yet when added to a composition they can significantly increase the flammability of the composition. While this may be an acceptable result for some environments it is unacceptable for others. In addition, often the testing is conducted only for the components of a composition and not for the overall composition and this can result in a false security.

There is another series of protocols and procedures that are used to evaluate the flammability of materials. The key test is the Underwriters Laboratory (UL) test method UL 94, "Test for Flammability of Plastic Materials for Parts in Devices and Appliances". This test has been used for several decades. It is periodically refined and can be obtained for a fee from Underwriters Laboratory. Other tests which have been harmonized with UL 94 include those from the International Electrotechnical Committee (IEC) and from the International Organization for Standardization (ISO). These tests include as IEC 60707, IEC 60695-11-10, IEC 60695-11-20, ISO 9772:2012, and ISO 9773. The test protocols are available for purchase from the respective organizations. A similar test was published by Laird Technologies 03/00 and can be found on the web at their site in the tech notes section. These methods describe, as stated in the abstract for ISO 9772-2012, a small-scale laboratory screening procedure for comparing the relative burning characteristics of horizontally oriented, small cellular plastic specimens, having a density of less than 250 kg/m$^3$, when exposed to an ignition source. The test involves holding a portion of the test material in contact with an ignition source, in this test a flame, for a specific period of time, then removing the sample from the flame and then measuring how long it takes the sample to self-extinguish or how rapidly the flame progresses. For the present invention the interest is in the self-extinguishing time.

In the present specification and claims the term "self-extinguishing time" means amount of time required for a sample to self-extinguish using the self-extinguishing test protocol as described below. The protocol of the present invention is a modification of the above described self-extinguishing tests.

In the present specification and claims the term "composite density" means the density of the microspheres in combination with one or more additional materials coated on or adhered to the microspheres. The term "microsphere density", as used herein, means the density of the microspheres, the thermoplastic shells, as measured or calculated in the absence of any further material coated on or adhered to the microspheres themselves. When a coating is present on the outer surface of the microspheres, the microsphere density may be calculated from the measured composite density using the known weight ratios of the microspheres and material(s) used to prepare the coated microspheres.

Because the addition of microspheres to compositions increases the flammability of the composition, many compositions that use microspheres must be modified to include flame retardants in the composition in addition to the microspheres. A variety of different substances have been employed as the flame retardant component of many compositions and these flame retardants including both inorganic and organic materials. A single flame retardant or a mixture of different flame retardants may be utilized. Illustrative flame retardants include: metal and alkaline earth metal hydroxides; melamines; ammonium polyphosphates (APP), including both short chain and long chain APP; zinc borates; organophosphorus compounds including non-halogenated organophosphorus compounds such as phosphate esters, phosphonium derivatives, and phosphonates as well as halogenated organophosphorus compounds such as tris(1-chloro-2-propyl)phosphate and tris(2-chloroethyl)phosphate); and halogenated compounds, for example, brominated flame retardants such as polybrominated diphenyl ethers and polybrominated biphenyls. The surface of such flame retardants may be treated or modified, for example, an ammonium polyphosphate may be coated with melamine. These flame retardants are readily available from a number of commercial sources including: the melamine-based flame retardants sold under the MELAPUR® brand by BASF, under the MELAGARD® brand by Italmatch, and under the BUDIT® brand by Budenheim; the organophosphorus flame retardants sold under the ANTIBLAZE® brand by Albemarle, under the EXOLIT® brand by Clariant, under the KRONITEX® and REOFOS® brands by Chemtura, and under the MASTERET® and PHOSLITE® brands by Italmatch; ammonium polyphosphate flame retardants sold under the ANTIBLAZE® brand by Albemarle, under the EXOLIT® brand by Clariant, and under the FR CROS® brand by Budenheim; the metal and alkaline earth metal hydroxides sold under the MAGNIFIN® and MARTINAL® brands by Albemarle, under the TIMONOX®, FIRESHIELD, THERMOGUARD®, PYROBLOC®, MICROFINE®, and ULTRAFINE® brands by Chemtura, and under the MICRAL® brand by J. M. Huber as well as the various aluminas sold by Alcan; halogenated flame retardants sold under the SAYTEX® brand by Albemarle and under the FIREMASTER® brand by PABU; and the zinc borate flame retardants sold under the FIREBRAKE® brand by Luzenac as well as those sold by Chemtura. As discussed above, one of the issues that use of these flame retardants in compositions raises is that they often increase the viscosity of the composition to a significant extent and this can cause processing issues.

As mentioned above, some of the compositions wherein microspheres find use include weld through sealants and weld through adhesives. Addition of microspheres to the compositions requires that additional levels of flame retardants be included in the composition to overcome the flammability caused by the microspheres. The common flame retardants used in these compositions include antimony trioxide with halides such as polyvinylchloride; brominated organic compounds such as decabromodiphenyloxide; and aluminum trihydroxide (ATH). Most formulations have switched to use of ATH alone for environmental and toxicological reasons. Aluminum trihydroxide is also sometimes referred to as alumina trihydrate, aluminum hydroxide, aluminum hydrate, hydrated alumina, or hydrated aluminum oxide. As a flame retardant ATH works by liberating water molecules and absorbing energy when it reaches a temperature of about 220° C.

The present invention derives from the unexpected finding that incorporation of very high levels of the flame retardant ATH in a coating on microspheres results in several unexpected benefits to inclusion of the ATH coated microspheres into compositions. The present invention relies on the use of coated microspheres comprising 80 to 90% by weight ATH as a coating and 20 to 10% by weight microspheres based on the total weight of the microspheres plus ATH coating. When ATH is incorporated at these high levels there are several unexpected benefits to use of the ATH coated microspheres in compositions. First, this level of ATH coating is much more effective as a flame retardant for the microspheres, at this level the ATH coating removes any need to add additional flame retardant to the composition along with the microspheres. This reduces the overall level of flame retardant required in the composition. Use of the inventive coated microspheres permits the self-extinguishing time of the composition to be maintained despite addition of the microspheres. Second, when incorporated in the coating the addition of the flame retardant does not increase the viscosity of the composition beyond the increase caused by the microspheres themselves. Third, reducing the level of flame retardant in the composition reduces the level of particulate in the composition since the usual flame retardants are added as particles. The lower level of particulate can be beneficial in several ways. In adhesive compositions added particulates can reduce the adhesive strength so the inventive microspheres should have a reduced effect on adhesive strength when used in adhesives. When particulates are added to sealants they can reduce the sealant film strength. So again use of the inventive microspheres should have a smaller effect on any reduction in film strength in sealants. These results were unexpected and provide a great benefit to use of microspheres in a variety of compositions. Utilizing the present invention will enable incorporation of microspheres at higher levels in compositions and into more compositions with minimal changes to production procedures and parameters. The present invention also reduces the cost associated with use of microspheres because it reduces the required levels of flame retardant based on the level of microspheres. In the present invention the preferred flame retardant is ATH. The present invention finds special use in weld through sealant compositions.

Preferably, the flame retardant is used as a solid rather than as a liquid and in the form of finely divided particles, i.e., solid particles which are relatively small in size. In certain embodiments of the invention, the flame retardant used has a median particle size of from about 1 to 5 microns, preferably from 2 to 4 microns. Particle size can be measured by use of a Malvern Mastersizer, S laser diffraction.

The particles of flame retardant may be regular or irregular in shape, e.g., spherical, rod-like, fibrous, platelet, and so forth. The flame retardant particles are embedded and/or bound to the outer surfaces of the microspheres as a coating. This is accomplished by heating an admixture of unexpanded microspheres and flame retardant particles at a temperature effective to soften the polymer shells of the microspheres, allowing the microspheres to expand, and then cooling the microspheres below the softening point of the polymer, thereby allowing the particles of the flame retardant to become physically attached to the microsphere outer surface, such microspheres may be referred to as having thermally clad or thermally bound coatings.

In accordance with the invention, one or more flame retardants are coated onto hollow polymeric microspheres, wherein said flame retardants are present in an amount of from 80 to 90% by weight based on the total weight of the flame retardant coated microspheres while maintaining a composite density of greater than 0.10 g/cm$^3$, preferably greater than 0.12 g/cm$^3$. In the context of this invention, "composite density" means the density of the microspheres in combination with one or more additional materials, e.g., flame retardant, coated on or adhered to the microspheres. "Microsphere density", as used herein, means the density of the microspheres as measured or calculated in the absence of any further material coated on, adhered to, or mixed with the microspheres themselves. When a coating is present on the outer surface of the microspheres, the microsphere density may be calculated from the measured composite density using the known weight ratios of the microspheres and material(s) used to prepare the coated microspheres. In preferred embodiments of the invention, the composite density of the flame retardant-coated microspheres is 0.10 g/cm$^3$ or greater, more preferably a composite density of 0.12 g/cm$^3$ or greater.

Although the size of the microspheres is not believed to be particularly critical, typically the microspheres useful in the present invention will have diameters when expanded that on average are from about 5 microns to about 500 microns or from about 100 to about 300 microns. In one embodiment, the mode particle size diameter of the microspheres is from about 50 to about 150 microns, where the mode particle size is the particle size value that occurs most often. The average shell thickness of the microspheres is from about 0.01 microns to about 0.5 microns, preferably about 0.05 to about 0.3 microns.

Methods of preparing expandable hollow polymeric microspheres are known in the art and are described, for example, in the following U.S. patents and published applications, each of which is incorporated herein by reference in its entirety: U.S. Pat. Nos. 3,615,972; 3,864,181; 4,006,273; 4,044,176; 6,235,394; 6,509,384; 6,235,800; 5,834,526; 5,155,138; 5,536,756; 6,903,143; 6,365,641; 7,351,752;

6,903,143; 2008-0017338; 2007-0287776; 2007-0208093; and 2005-0080151, as well as published PCT applications WO2007/046273 and WO2007/058379, each of which is also incorporated herein by reference in its entirety.

Methods of expanding hollow polymeric microspheres containing blowing agents are also known in the art and are described, for example, in certain of the patents mentioned in the immediately preceding paragraph as well as the following U.S. patents and published applications, each of which is incorporated herein by reference in its entirety: U.S. Pat. Nos. 5,484,815; 7,192,989 and 2004-0176487.

In a particularly preferred embodiment of the present invention, the preparation of hollow polymeric microspheres containing an adherent outer coating of flame retardant is carried out by adaptation of the methods known in the art for preparing thermally clad microspheres having particulate processing aids adhered to their outer surfaces, as described, for example, in the following U.S. patents and published applications, each of which is incorporated herein by reference in its entirety: U.S. Pat. Nos. 4,722,943; 4,829,094; 4,843,104; 4,888,241; 4,898,892; 4,898,894; 4,908,391; 4,912,139; 5,011,862; 5,180,752; 5,580,656; 6,225,361; 5,342,689; 7,368,167 and 2005-0282014.

In particular, the present invention preferably begins with unexpanded and uncoated microspheres. Examples of these microspheres include the Dualite® series of polymeric microspheres available from Henkel. These microspheres have a polymeric shell and contain a low boiling point liquid to function as the blowing agent when they are expanded. In a first step the microspheres are dried to a moisture content of 0.5% or less. Then the dried microspheres are mixed with the flame retardant, preferably ATH, at a ratio of 80 to 90% by weight ATH and 20 to 10% by weight microspheres. The mixture is mixed under low shear conditions and then the mixture is subjected to low shear mixing in an expansion chamber at a temperature of 200 to 210° C. for 60 seconds or less. The expanded microspheres then have a coating of 80 to 90% by weight of ATH and are expanded to a composite density of 0.10 g/cm$^3$ or greater, preferably 0.12 g/cm$^3$ or greater. The expanded, ATH coated microspheres can then be incorporated into compositions at levels of from 1 to 25% by weight, preferably 1 to 10% by weight, more preferably from 1 to 5% by weight based on the total weight of the composition.

Hollow polymeric microspheres according to the present invention can be made from a wide diversity of thermoplastic polymers including crosslinked thermoplastic polymers. In at least certain embodiments of the invention, the microspheres are comprised of one or more polymeric materials which are homopolymers or copolymers, it being understood that this term includes terpolymers, tetrapolymers, etc., of one or more monomers selected from the group consisting of vinylidene chloride and acrylonitrile wherein the vinylidene chloride and acrylonitrile may be copolymerized with each other and/or with other types of ethylenically unsaturated monomers The microspheres useful in the present invention may be manufactured using polymers obtained by polymerizing one or more ethylenically unsaturated monomers such as vinylidene chloride, vinylidene dichloride, vinyl chloride, acrylonitrile, methacrylonitrile, alkyl acrylates and alkyl methacrylates, including methyl methacrylate, methyl acrylate, butyl acrylate, butyl methacrylate, isobutyl methacrylate, stearyl methacrylate, and other related acrylic monomers such as 1,3-butylene dimethacrylate, allyl methacrylate, trimethylolpropane trimethacrylate, trimethylolpropane triacrylate, 1,4-butanediol dimethacrylate, 1,3-butanediol dimethacrylate, isobornyl methacrylate, dimethylaminoethyl methacrylate, hydroxyethyl methacrylate, hydroxypropyl methacrylate, diurethane dimethacrylate, and ethylene glycol dimethacrylate. Other monomers such as, for example, vinyl aromatic compounds, olefins and the like may be included in the polymer, typically in minor proportions.

The monomers used to prepare the polymer may comprise multifunctional monomers which are capable of introducing crosslinking. Such monomers include two or more carbon-carbon double bonds per molecule which are capable of undergoing addition polymerization with the other monomers. Suitable multifunctional monomers include divinyl benzene, di(meth)acrylates, tri(meth)acrylates, allyl (meth) acrylates, and the like. If present, such multifunctional monomers preferably comprise from about 0.1 to about 1 weight percent or from about 0.2 to about 0.5 weight percent of the total amount of monomer. In one embodiment, the thermoplastic is a terpolymer of acrylonitrile, vinylidene chloride and a minor proportion, normally less than 5% by weight, of divinyl benzene. In an especially preferred embodiment the microspheres used in the present invention have a shell comprising predominantly acrylonitrile.

The coated microspheres according to the invention may be utilized as low density fillers or components in a wide variety of end uses, including plastics, composites, resins, paper, textiles, sealants, weld through sealants, weld through adhesives, and adhesives. The microspheres can reduce product weight and lower volume costs by extending or displacing more costly components of such products. Additionally, the flame retardant present as a coating on the microspheres can assist in reducing the flammability of a formulated product containing the microspheres. The coated microspheres according to the present invention comprise from 80 to 90% by weight of a flame retardant as a coating. Preferably the flame retardant is aluminum trihydroxide. The coated microspheres have a composite density of 0.1 g/cm$^3$ or greater, more preferably a composite density of 0.12 g/cm$^3$ or greater. Having the flame retardant coating on the microspheres enhances the flame resistance of the microspheres and when the microspheres are added to compositions them do not increase a self-extinguishing time of the composition by more than 5%. This is an unexpected benefit of the present microspheres. Addition of the microspheres according to the present invention also eliminates the need to add additional flame retardant to the composition due to the presence of the microspheres. Addition of the present microspheres does not increase the viscosity of the composition by more than 65% and the presence of the flame retardant on the microspheres prevents any increase in viscosity associated with the flame retardant itself. The only increase in viscosity is due to the microspheres themselves. This is an unexpected benefit of the present microspheres.

EXAMPLES

Base Sealant

The base sealant used for example purposes only was Terostat® SA-4000.5, also known as Teroson® PV 4000.5, available from Henkel. Other base components can be used with the present invention including coatings, adhesives, other sealants, and other composites. Terostat® SA-40000.5 is a weld through sealant. It is a cold applied, pumpable, wash resistant, elastomeric-based vinyl plastisol sealer. It is intended for use in spot welded joints. It is designed to expand when subjected to heat to form a soft, closed cell, foam. The base sealant used in the experimental data described below included 6% by weight of the flame retardant ATH. According to the Material Safety Data Sheet of Teroson® PV 4000.5 issued May 17, 2013 it comprises: 10-30 weight % phthalic acid esters; 10-30 weight % calcium carbonate; 10-30 weight % fibrous aluminum oxide; 10-30 weight % polyvinylchloride polymer; 5-10 weight % limestone; 1-5 weight % co-polymeric styrene, butadiene, divinylbenzene; 1-5 weight % epichlorohydrin-4,4'-isopropylidene diphenol resin; 1-5 weight % vinyl chloride-vinyl acetate copolymer; 1-5 weight % C,C'-Azodi(formamide); 1-5 weight % acrylonitrile polymer with 1,3-butadiene; 1-5 weight % calcium oxide; and 0.1-1 weight % titanium dioxide.

Comparative Microspheres

The comparative microspheres, not prepared in accordance with the present invention, used were Dualite E130-095D available from Henkel and were used as obtained from the manufacturer. These microspheres comprise 85 weight % calcium carbonate as a coating, 15 weight % of a co-polymer shell comprising acrylonitrile and isopentane as the blowing agent. The microspheres have an expanded mode peak size range of from 85 to 105 microns.

Inventive Microspheres

The inventive microspheres in accordance with the present invention were prepared as follows. The base microspheres were Dualite® U010-185D microspheres obtained from Henkel, they are formed from a shell comprising predominantly acrylonitrile with a blowing agent of isopentane. They have an average unexpanded particle size of 20 to 30 microns. First, the microspheres are dried to a moisture level of 0.5% or less. In this particular example, the microspheres are then mixed with the ATH at a weight ratio of 85% ATH and 15% microspheres. In accordance with the present invention, the flame retardant can be mixed with the microspheres at a weight ratio of 80 to 90% by weight flame retardant and 20 to 10% by weight microspheres. The components are mixed and then the mixture is processed through a low shear expansion chamber at a temperature of from 200 to 210° C. with a residence time of 60 seconds or less. The resulting expanded microspheres are fully coated with the ATH.

Self-Extinguishing Test Protocol

The testing protocol for the self-extinguishing time of the various sealants is as follows. The test sealants are mixed and allowed to equilibrate at room temperature. For each test run a 3 to 5 mm in diameter sample of each sealer is applied to a tip of a spatula. The spatula tip and sealer are positioned in a Bunsen burner flame above the cone in the blue part of the flame and held there for 10 seconds. The spatula tip and sealer are then removed from the flame and the length of time between removal of the tip and the self-extinguishing of the flame on the sealer is measured. For any sample wherein the flame does not self-extinguish after 10 seconds the test is discontinued and a value of 10 seconds is recorded. The results reported in Table 1 are the average of 2 trials with 10 test runs for each condition. The reported ATH equivalent is calculated by using the amount of ATH found in 3 grams of inventive microspheres, 2.55 grams, as equal to 1 equivalent of ATH. The results are reported in Table 1 below.

Viscosity Measurements

The viscosities of the sealant formulations were tested as follows. Each sealant with its added components was tested on a Rheomet 550 rheometer using a 40 mm, 400 micron gap plate at a temperature of 25° C. and a shear rate of $1^{-sec}$. The results are reported in Pascal-seconds (Pa·s). The result for each sample is reported in Table 2 below.

TABLE 1

| Component added to 100 (g) of base sealant | Base sealant | Inventive sealant | Comp. sealant 1 | Comp. sealant 2 | Comp. sealant 3 | Comp. sealant 4 | Comp. sealant 5 |
|---|---|---|---|---|---|---|---|
| ATH coated microspheres (g) | 0 | 3 | 0 | 0 | 0 | 0 | 0 |
| Comparative microspheres (g) | 0 | 0 | 3 | 3 | 3 | 3 | 3 |
| Free ATH (g) | 0 | 0 | 0 | 2.5 | 3.75 | 5 | 7.5 |
| ATH equivalents | 0 | 1.0 | 0 | 1.0 | 1.5 | 2.0 | 2.9 |
| Ave. self-extinguishing time (seconds) | 3.45 | 3.55 | 6.10 | 5.40 | 3.90 | 2.35 | 2.85 |

The self-extinguishing time test results show that the base sealant had a self-extinguishing time of 3.45 seconds. Unexpectedly, addition of the inventive microspheres did not significantly increase the self-extinguishing time. The self-extinguishing time in the presence of 3% of the inventive microspheres was 3.55 seconds, which is only 2.8% greater than the time for the base sealant alone. This is a completely unexpected result. The expected result is seen in Comparative sealant 1 wherein addition of 3% by weight of microspheres not in accordance with the present invention caused the self-extinguishing time to increase to 6.10 seconds, which is an increase of 77% of the base sealant time. Unexpectedly, as shown in the results for Comparative sealant 2, adding the same amount of ATH, 1 equivalent, as free ATH to the base sealant plus the comparative microspheres was not sufficient to reduce the flammability to the level found in the absence of the microspheres. The self-extinguishing time of Comparative sealant 2 was 5.40 which is 56% greater than the base sealant. Likewise in Comparative sealant 3 using 1.5 equivalents of free ATH, the self-extinguishing time at 3.90 seconds is still 13% greater than for the base sealant. When the free ATH is at a level of 2 equivalents of the amount found on the inventive microspheres, Comparative sealant 4, the self-extinguishing time is reduced to below that found in the base sealant itself at 2.35 seconds. The results show that the present invention dramatically reduces the required level of flame retardant. The presence of the flame retardant on the microspheres increases its effectiveness.

TABLE 2

| Component added to 100 (g) of base sealant | Base sealant | Inventive sealant | Comp. sealant 1 | Comp. sealant 2 | Comp. sealant 3 | Comp. sealant 4 | Comp. sealant 5 |
|---|---|---|---|---|---|---|---|
| ATH coated microspheres (g) | 0 | 3 | 0 | 0 | 0 | 0 | 0 |
| Comparative microspheres (g) | 0 | 0 | 3 | 3 | 3 | 3 | 3 |
| Free ATH (g) | 0 | 0 | 0 | 2.5 | 3.75 | 5 | 7.5 |
| ATH equivalents | 0 | 1.0 | 0 | 1.0 | 1.5 | 2.0 | 2.9 |
| Viscosity (Pa · s) | 1,089 | 1,748 | 1,776 | 1,797 | 1,918 | 1,934 | 2,132 |

The results in Table 2 show another unexpected benefit of the present invention. Namely, the present inventive microspheres with flame retardant do not increase the viscosity of the base sealant beyond the increase caused by the microspheres themselves despite the presence of the flame retardant. As shown the increase in viscosity caused by addition of the 3% by weight of the inventive microspheres is 60%, from 1,089 to 1,748. This increase is slightly less than that see in the Comparative sealant 1 which included just the microspheres, from 1,089 to 1,776, an increase of 63%. The results further show that as one adds free ATH in an attempt to reduce the self-extinguishing time back to that of the base sealant the viscosity increases dramatically. At a level of 1.5 equivalents of ATH, which does not restore the self-extinguishing time, the increase in viscosity is from 1,089 to 1,918 which is an increase of 76%. Thus, the presence of the flame retardant on the microspheres completely eliminates the increase in viscosity that should be associated with the addition of the flame retardant to the composition. See the viscosity of the inventive sealant and Comparative sealant 1. This result is also unexpected and makes the inventive microspheres unique.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A composition comprising:
a base component comprising a weld through sealant;
a plurality of hollow, expanded microspheres having a composite density of 0.1 g/cm$^3$ or greater and comprising from 80 to 90% by weight of aluminum trihydroxide, wherein said microspheres are present in an amount of from 1 to 25% by weight based on the total weight of said composition and wherein the presence of said microspheres does not increase a self-extinguishing time of said base component by more than 5%.

2. The composition as recited in claim 1, wherein said weld through sealant has a self-extinguishing time of from 3 to 5 seconds.

3. The composition as recited in claim 1, wherein a viscosity of said composition is not increased by more than 65% by addition of said microspheres.

4. The composition as recited in claim 1, wherein said hollow, expanded microspheres have a composite density of 0.12 g/cm$^3$ or greater.

5. The composition as recited in claim 1, wherein said hollow, expanded microspheres comprise acrylonitrile.

6. The composition as recited in claim 1, wherein said microspheres are present in an amount of from 1 to 5% by weight based on the total weight of the composition.

7. The composition as recited in claim 1, wherein the presence of said microspheres does not increase a self-extinguishing time of said base component by more than 3%.

8. A method of maintaining the nonflammability of a base component while reducing its density comprising the steps of:
a) providing a base component comprising a weld through sealant;
b) providing a plurality of hollow, expanded microspheres having a composite density of 0.1 g/cm$^3$ or greater and comprising from 80 to 90% by weight of aluminum trihydroxide;
c) combining said microspheres in an amount of from 1 to 25% by weight based on the total weight of said composition with said base composition, wherein addition of said microspheres does not increase self-extinguishing time of said base component by more than 5%.

9. The method as recited in claim 8, comprising providing the weld through sealant having a self-extinguishing time of from 3 to 5 seconds.

10. The method as recited in claim 8, wherein step b) comprises providing hollow, expanded microspheres having a composite density of 0.12 g/cm$^3$ or greater.

11. The method as recited in claim 8, wherein step b) comprises providing hollow, expanded microspheres comprising acrylonitrile.

12. The method as recited in claim 8, wherein step c) comprises combining said microspheres in an amount of from 1 to 5% by weight based on the total weight of said composition.

13. The method as recited in claim 8, comprising providing hollow expanded microspheres that do not increase said self-extinguishing time of said base component by more than 3%.

14. The method as recited in claim 8, comprising providing hollow expanded microspheres that do not increase a viscosity of said base component by more than 65%.

15. A laminate comprising:
a metal substrate; and
a composition applied to said metal substrate; said composition comprising a weld through sealant and a plurality of microspheres, said microspheres present in an amount of from 1 to 25% by weight based on a total weight of said composition and wherein said microspheres comprise 80 to 90% by weight of aluminum trihydroxide and have a composite density of 0.1 g/cm$^3$ or greater, and wherein the presence of said microspheres does not increase a self-extinguishing time of said weld through sealant by more than 5%.

16. The laminate of claim 15 wherein said microspheres are present in an amount of 1 to 5% by weight.

17. The laminate of claim 15 wherein said self-extinguishing time of said weld through sealant is from 3 to 5 seconds.

18. The laminate of claim 15 wherein the presence of said microspheres does not increase a viscosity of said weld through sealant by more than 65%.

\* \* \* \* \*